US010081392B2

(12) United States Patent
Tsuneyama (10) Patent No.: US 10,081,392 B2
(45) Date of Patent: Sep. 25, 2018

(54) VEHICLE PILLAR STRUCTURE (71) Applicant: TOYOTA JIDOSHA KABUSHIKI KAISHA, Toyota-shi, Aichi-ken (JP)

(72) Inventor: Teppei Tsuneyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/639,249

(22) Filed: Jun. 30, 2017

(65) Prior Publication Data
US 2018/0043938 A1 Feb. 15, 2018

(30) Foreign Application Priority Data

Aug. 9, 2016 (JP) ................................ 2016-156927

(51) Int. Cl.
*B62D 21/15* (2006.01)
*B62D 25/04* (2006.01)
(52) U.S. Cl.
CPC ........... *B62D 21/152* (2013.01); *B62D 25/04* (2013.01)
(58) Field of Classification Search
CPC .............................. B62D 21/152; B62D 25/04
USPC ....................................... 296/187.09, 196.06
See application file for complete search history.

(56) References Cited

U.S. PATENT DOCUMENTS

| 4,470,619 | A | * | 9/1984 | Imajyo | .................... | B60R 22/24 |
| | | | | | | 280/808 |
| 5,398,989 | A | * | 3/1995 | Winter | ................... | B62D 25/04 |
| | | | | | | 29/557 |
| 6,293,618 | B1 | * | 9/2001 | Sukegawa | .............. | B62D 25/04 |
| | | | | | | 296/203.01 |
| 6,595,579 | B2 | * | 7/2003 | Freitag | ................... | B62D 25/04 |
| | | | | | | 296/187.12 |
| 7,152,914 | B2 | * | 12/2006 | Dingman | ............... | B62D 25/04 |
| | | | | | | 296/193.05 |
| 7,510,234 | B2 | * | 3/2009 | Ameloot | ................ | B62D 25/04 |
| | | | | | | 296/187.12 |
| 7,959,217 | B2 | * | 6/2011 | Onuma | .................. | B62D 25/04 |
| | | | | | | 296/146.11 |
| 7,963,588 | B2 | * | 6/2011 | Kanagai | ............... | B62D 21/157 |
| | | | | | | 296/187.12 |
| 2015/0375800 | A1 | * | 12/2015 | Wagner | ................ | B62D 29/046 |
| | | | | | | 296/187.03 |

(Continued)

FOREIGN PATENT DOCUMENTS

JP 2011-162103 A 8/2011
JP 2011-178218 A 9/2011

(Continued)

*Primary Examiner* — Pinel E Romain
(74) *Attorney, Agent, or Firm* — Oliff PLC (57) ABSTRACT

An inner side reinforcing member is disposed at an interior of a pillar main body portion, is joined to a pillar inner panel, projects out toward a pillar outer panel side, and forms a second closed cross-section portion together with the pillar inner panel. In contrast, an outer side reinforcing member is disposed at the interior of the pillar main body portion, is joined to a pillar outer panel, projects-out toward the pillar inner panel side, and forms a third closed cross-section portion together with the pillar outer panel. The outer side reinforcing member is provided at a vehicle front side of the inner side reinforcing member, and overlaps a portion of the inner side reinforcing member as seen in a vehicle front view.

7 Claims, 9 Drawing Sheets

(56) References Cited

U.S. PATENT DOCUMENTS

2016/0194033 A1* 7/2016 Kondo .................. B62D 25/04
296/192

FOREIGN PATENT DOCUMENTS

| JP | 2012-025174 A | 2/2012 |
| JP | 2016-088135 A | 5/2016 |
| JP | 2016-113083 A | 6/2016 |
| JP | 2016-113084 A | 6/2016 |

* cited by examiner

VEHICLE PILLAR STRUCTURE

CROSS-REFERENCE TO RELATED APPLICATION

This application claims priority under 35 USC 119 from Japanese Patent Application No. 2016-156927 filed Aug. 9, 2016, the disclosure of which is incorporated by reference herein.

BACKGROUND

Technical Field

Technology disclosed herein relates to a vehicle pillar structure.

Related Art

There are known structures in which a reinforcing member for handling a collision is disposed within a pillar of a vehicle (refer to Japanese Patent Application Laid-Open (JP-A) No. 2016-88135, JP-A No. 2011-178218 and JP-A No. 2012-25174). For example, JP-A No. 2016-88135 discloses a structure in which a bulkhead is provided so as to bridge in the vehicle transverse direction between a pillar outer and a pillar inner. In this structure, the bulkhead is superposed with and joined to the pillar outer and the pillar inner. Due to such a bulkhead being provided, cross-sectional deformation of the pillar is suppressed even if load in the vehicle longitudinal direction is input to the pillar at the time of a vehicle collision.

SUMMARY

In the case of the above-described prior art, if the superposed portion of the pillar outer and the bulkhead and the superposed portion of the pillar inner and the bulkhead are welded only from the outer side of pillar, it is difficult to join them together well as compared with a case in which they are welded together from the outer side and the inner side of the pillar. On the other hand, if the superposed portion of the pillar outer and the bulkhead and the superposed portion of the pillar inner and the bulkhead are spot-welded by a welding gun from the outer side and the inner side of the pillar, a work hole for insertion of the welding gun must be formed so as to pass-through the pillar, and therefore, there is the drawback that the rigidity of the pillar decreases by that much. Accordingly, in a case in accordance with the above-described prior art, there is room for improvement with regard to the point of joining a reinforcing member for handling a collision to the pillar outer and the pillar inner well without providing a work hole in the pillar.

In view of the above-described circumstances, one embodiment of the technique of the present disclosure provides a vehicle pillar structure that can join reinforcing members to a pillar outer panel and a pillar inner panel well even if a work hole is not provided in a pillar, and can suppress cross-sectional deformation of the pillar with respect to load input in the vehicle longitudinal direction.

A vehicle pillar structure relating to a first aspect of the technique of the present disclosure has: a pillar inner panel that structures a region at a vehicle transverse direction inner side of a pillar main body portion, the pillar main body being disposed at a vehicle side portion and extending along a vehicle vertical direction; a pillar outer panel that structures a region at a vehicle transverse direction outer side of the pillar main body portion, and that forms a first closed cross-section portion together with the pillar inner panel; an inner side reinforcing member that is disposed at an interior of the pillar main body portion, that is joined to the pillar inner panel, that projects out toward the pillar outer panel side, and that forms a second closed cross-section portion together with the pillar inner panel; and an outer side reinforcing member that is disposed at the interior of the pillar main body portion, that is joined to the pillar outer panel, that projects out toward the pillar inner panel side, that forms a third closed cross-section portion together with the pillar outer panel, that is provided at a vehicle front side or a vehicle rear side of the inner side reinforcing member, and that overlaps with at least a portion of the inner side reinforcing member as seen in a vehicle front view.

In accordance with the above-described structure, the first closed cross-section portion is formed by the pillar inner panel, which structures the region at the vehicle transverse direction inner side of the pillar main body portion, and the pillar outer panel, which structures the region at the vehicle transverse direction outer side of the pillar main body portion. Further, the inner side reinforcing member, which is joined to the pillar inner panel, and the outer side reinforcing member, which is joined to the pillar outer panel, are disposed at the interior of the pillar main body portion. Therefore, if the inner side reinforcing member is joined to the pillar inner panel and the outer side reinforcing member is joined to the pillar outer panel before the first closed cross-section portion is formed by the pillar inner panel and the pillar outer panel, joining can be carried out well at the above-described joined places even if a work hole is not provided in the pillar main body portion.

Further, the inner side reinforcing member projects out toward the pillar outer panel side, and, together with the pillar inner panel, forms the second closed cross-section portion. In contrast, the outer side reinforcing member projects out toward the pillar inner panel side, and, together with the pillar outer panel, forms the third closed cross-section portion. The outer side reinforcing member is provided at the vehicle front side or the vehicle rear side of the inner side reinforcing member, and overlaps with at least a portion of the inner side reinforcing member as seen in a vehicle front view. Further, in a case in which the load in the vehicle longitudinal direction is input to the pillar main body portion, that load is transmitted from the load input side of the pillar main body portion via one of the inner side reinforcing member and the outer side reinforcing member to the other of the inner side reinforcing member and the outer side reinforcing member, and further is transmitted from that other reinforcing member toward the side opposite the load input side of the pillar main body portion. Therefore, cross-sectional deformation of the pillar is suppressed.

In a vehicle pillar structure relating to a second aspect of the technique of the present disclosure, in the structure relating to the first aspect of the technique of the present disclosure, the inner side reinforcing member is formed in an open cross-sectional shape that opens toward a vehicle transverse direction inner side as seen in a vehicle front view, and the outer side reinforcing member is formed in an open cross-sectional shape that opens toward a vehicle transverse direction outer side as seen in a vehicle front view.

In accordance with the above-described structure, because the inner side reinforcing member is formed in an open cross-sectional shape that opens toward the vehicle transverse direction inner side as seen in a vehicle front view, the second closed cross-section portion that is formed by the inner side reinforcing member and the pillar inner panel extends in the vehicle longitudinal direction. Further, because the outer side reinforcing member is formed in an open cross-sectional shape that opens toward the vehicle transverse direction outer side as seen in a vehicle front view, the third closed cross-section portion that is formed by the outer side reinforcing member and the pillar outer panel extends in the vehicle longitudinal direction. Therefore, in a case in which load in the vehicle longitudinal direction is input to the pillar main body portion, load is transmitted along the extending directions of the second closed cross-section portion and the third closed cross-section portion, and therefore, cross-sectional deformation of the pillar is suppressed effectively.

In a vehicle pillar structure relating to a third aspect of the technique of the present disclosure, in the structure relating to the second aspect of the technique of the present disclosure, flange portions, which jut out toward outer sides of open cross-sections of the inner side reinforcing member and the outer side reinforcing member and have regions that overlap with one another as seen in a vehicle front view, are formed at end portions of the inner side reinforcing member and the outer side reinforcing member, the end portions being at sides at which the inner side reinforcing member and the outer side reinforcing member face one another.

In accordance with the above-described structure, in a case in which load in the vehicle longitudinal direction is input to the pillar main body portion, and load is transmitted from one of the inner side reinforcing member and the outer side reinforcing member to the other of the inner side reinforcing member and the outer side reinforcing member, load is transmitted from one of to the other of the flange portions that have regions that face one another. Due thereto, the surface area of contact of the inner side reinforcing member and the outer side reinforcing member can be made to be large as compared with a structure that does not have the flange portions, and the load transmitting efficiency can be improved.

In a vehicle pillar structure relating to a fourth aspect of the technique of the present disclosure, in the structure relating to the second aspect or the third aspect of the technique of the present disclosure, a front end of the inner side reinforcing member is inclined to a vehicle front side toward a vehicle transverse direction inner side, and a rear end of the inner side reinforcing member is inclined to a vehicle rear side toward a vehicle transverse direction inner side, and a front end of the outer side reinforcing member is inclined to a vehicle front side toward a vehicle transverse direction outer side, and a rear end of the outer side reinforcing member is inclined to a vehicle rear side toward a vehicle transverse direction outer side.

In accordance with the above-described structure, the front end of the inner side reinforcing member is inclined to the vehicle front side toward the vehicle transverse direction inner side, and the rear end thereof is inclined to the vehicle rear side toward the vehicle transverse direction inner side. Therefore, the length, in the vehicle longitudinal direction, of the region of the inner side reinforcing member at the side that is joined to the pillar inner panel can be made to be long. Therefore, the pillar inner panel and the inner side reinforcing member can be joined together more securely. Further, the front end of the outer side reinforcing member is inclined to the vehicle front side toward the vehicle transverse direction outer side, and the rear end thereof is inclined to the vehicle rear side toward the vehicle transverse direction outer side. Therefore, the length, in the vehicle longitudinal direction, of the region of the outer side reinforcing member at the side that is joined to the pillar outer panel can be made to be long. Therefore, the pillar outer panel and the outer side reinforcing member can be joined together more securely. Due to the above, in a case in which load in the vehicle longitudinal direction is input to the pillar main body portion, deformation of the joined portion side of the pillar inner panel and the inner side reinforcing member can be suppressed more, and deformation of the joined portion side of the pillar outer panel and the outer side reinforcing member can be suppressed more.

In a vehicle pillar structure relating to a fifth aspect of the technique of the present disclosure, in the structure relating to any one of the second aspect through the fourth aspect of the technique of the present disclosure, a ridgeline portion that extends in a vehicle longitudinal direction is formed at the inner side reinforcing member and at the outer side reinforcing member respectively, and the ridgeline portion at one of the inner side reinforcing member or the outer side reinforcing member is set at a position that overlaps with a portion of another of the inner side reinforcing member or the outer side reinforcing member as seen in a vehicle front view.

In accordance with the above-described structure, a ridgeline portion that extends in the vehicle longitudinal direction is formed at the inner side reinforcing member and at the outer side reinforcing member, respectively. Therefore, in a case in which load in the vehicle longitudinal direction is input to the inner side reinforcing member and the outer side reinforcing member, the load is mainly transmitted in the vehicle longitudinal direction along the ridgeline portions. Here, the ridgeline portion of one of the inner side reinforcing member and the outer side reinforcing member is set at a position that overlaps with a portion of the other of the inner side reinforcing member or the outer side reinforcing member as seen in a vehicle front view. Thus, in a case in which load in the vehicle longitudinal direction is input to the inner side reinforcing member or the outer side reinforcing member, load can be transmitted well between the ridgeline portion at the one of the inner side reinforcing member or the outer side reinforcing member and a portion of the other of the inner side reinforcing member or the outer side reinforcing member.

As described above, in accordance with the vehicle pillar structure of the technique of the present disclosure, there are the excellent effects that the reinforcing members can be joined well to the pillar outer panel and the pillar inner panel without providing a work hole in the pillar, and cross-sectional deformation of the pillar with respect to load input in the vehicle longitudinal direction can be suppressed.

BRIEF DESCRIPTION OF THE DRAWINGS

Exemplary embodiments of the present invention will be described in detail based on the following figures, wherein.

DETAILED DESCRIPTION

First Embodiment

An example of a vehicle pillar structure relating to a first embodiment of the technique of the present disclosure is described by using FIG. 1 through FIG. 6. Note that arrow FR that is shown appropriately in these drawings indicates the vehicle forward side, arrow UP indicates the vehicle upward side, and arrow OUT indicates a vehicle transverse direction outer side.

Figure 1:
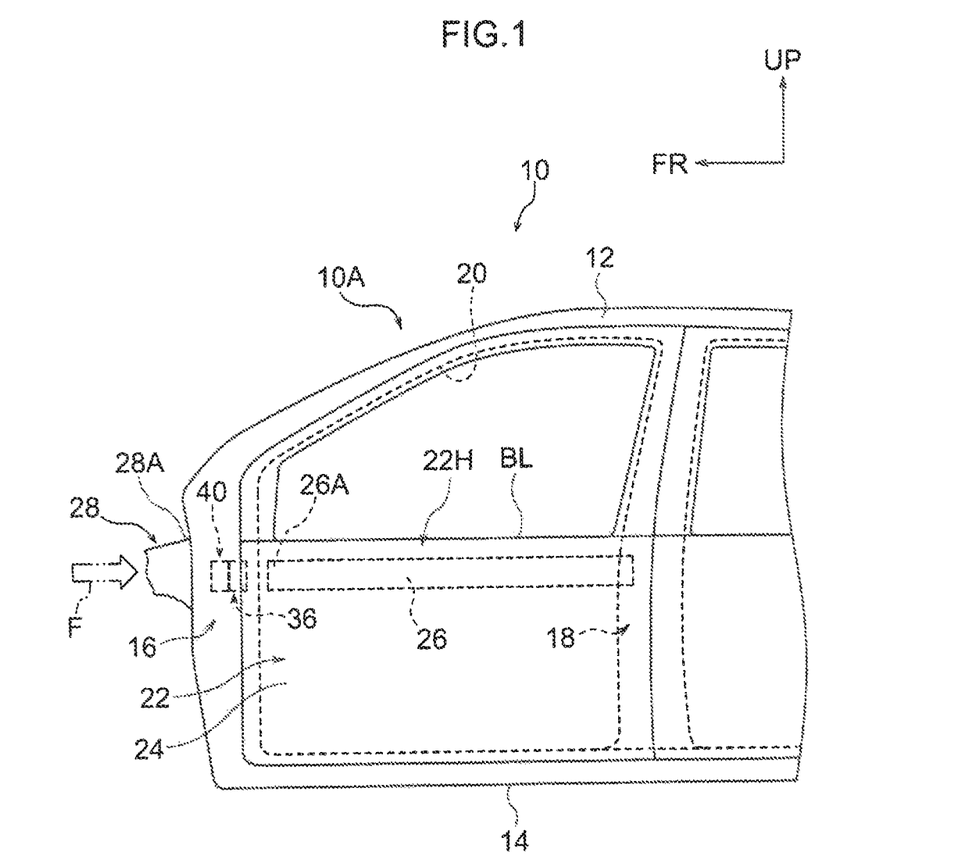
FIG. 1 is a side view showing an example of a portion of a vehicle to which a vehicle pillar structure relating to a first embodiment is applied.

An example of a portion of a vehicle 10, to which the vehicle pillar structure relating to the present embodiment is applied, is shown in a side view in FIG. 1. As shown in this drawing, a roof side rail 12 is disposed at the upper portion of a vehicle side portion 10A. The roof side rail 12 extends along the vehicle longitudinal direction. In contrast, a rocker 14 is disposed at the lower portion of the vehicle side portion 10A. The rocker 14 extends along the vehicle longitudinal direction. Further, a front pillar 16 that serves as a pillar stands erect toward the vehicle upper side from the front end portion of the rocker 14. The upper end portion of the front pillar 16 is connected to the front end portion of the roof side rail 12. Moreover, a center pillar 18 that serves as a pillar stands erect toward the vehicle upper side from a length direction intermediate portion of the rocker 14. The upper end portion of the center pillar 18 is connected to a length direction intermediate portion of the roof side rail 12. Note that FIG. 1 illustrates an example of the vehicle side portion 10A from about the vehicle front side of the front pillar 16 to about the vehicle rear side of the center pillar 18.

The above-described roof side rail 12, rocker 14, front pillar 16 and center pillar 18 all are closed cross-sectional structures and structure vehicle body frame members. Further, a front door opening portion 20, which is surrounded by the roof side rail 12, the front pillar 16, the rocker 14 and the center pillar 18, is formed at the front portion side of the vehicle side portion 10A. In other words, the roof side rail 12 is disposed along the vehicle longitudinal direction at the upper edge side of the front door opening portion 20, and the rocker 14 is disposed along the vehicle longitudinal direction at the lower edge side of the front door opening portion 20. Further, the front pillar 16 is disposed along the vehicle vertical direction at the front edge side of the front door opening portion 20, and the center pillar 18 is disposed along the vehicle vertical direction at the rear edge side of the front door opening portion 20.

The front door opening portion 20 communicates the vehicle cabin exterior with the vehicle cabin interior, and is opened and closed by a front side door 22 that serves as a side door. The front side door 22 has a door main body portion 22H that is formed by a door inner panel (not shown), which is disposed at the vehicle cabin inner side and structures the door inner plate, and a door outer panel 24, which is disposed at the vehicle cabin outer side of this door inner panel and structures the door outer plate. A belt line reinforcement 26 is disposed along beltline BL with the length direction thereof being the vehicle longitudinal direction, at the upper end portion of the interior of the door main body portion 22H.

A rear end portion 28A of an apron upper member 28 is joined to the front surface side of the front pillar 16. The apron upper member 28 is formed substantially in the shape of a rectangular tube and extends along the vehicle longitudinal direction.

Figure 2:
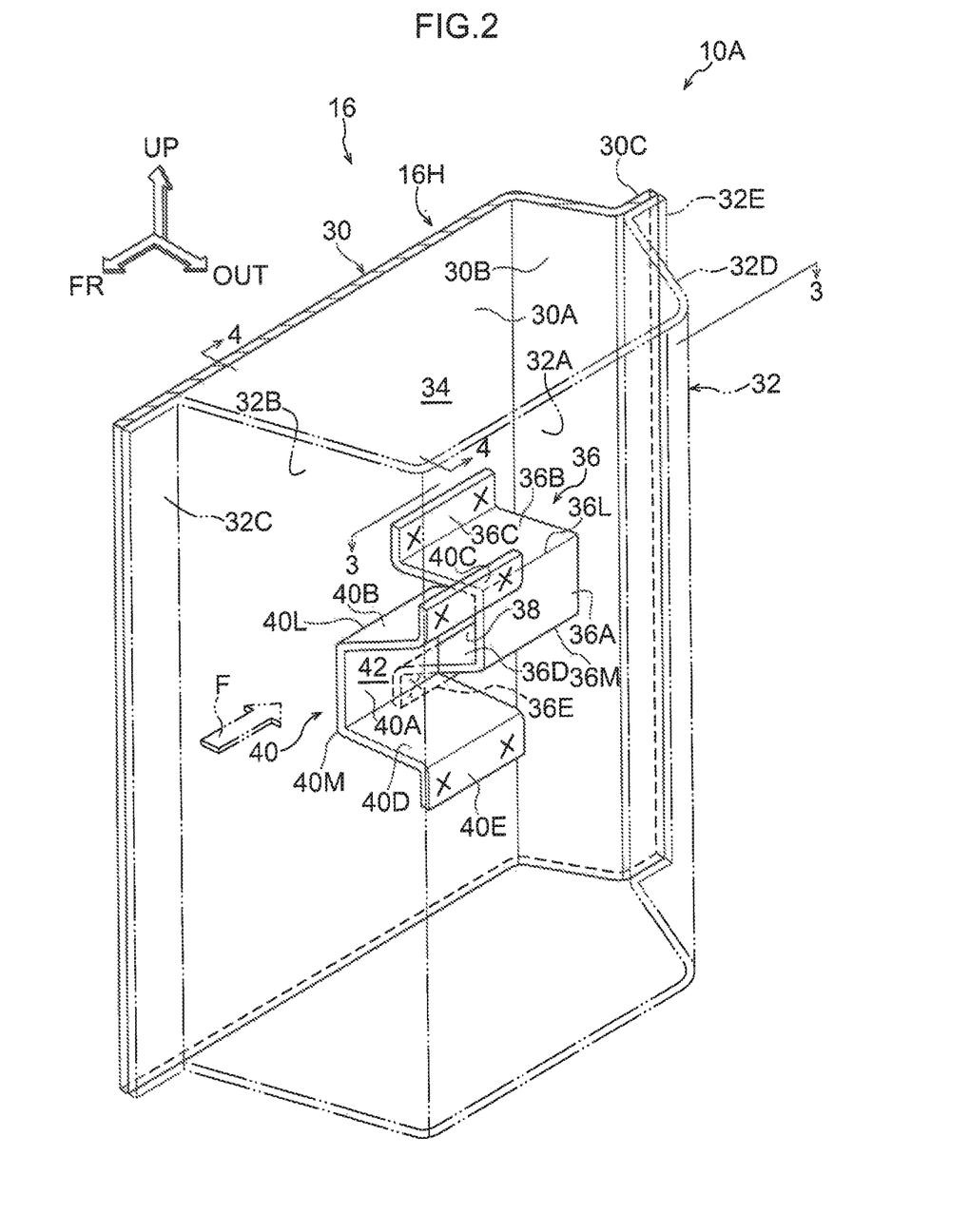
FIG. 2 is a perspective view that shows an example of a portion of a front pillar to which the vehicle pillar structure shown in FIG. 1 is applied, and in which a pillar outer panel is seen-through and the outer shape thereof is shown by two-dot chain lines.
Figure 3:
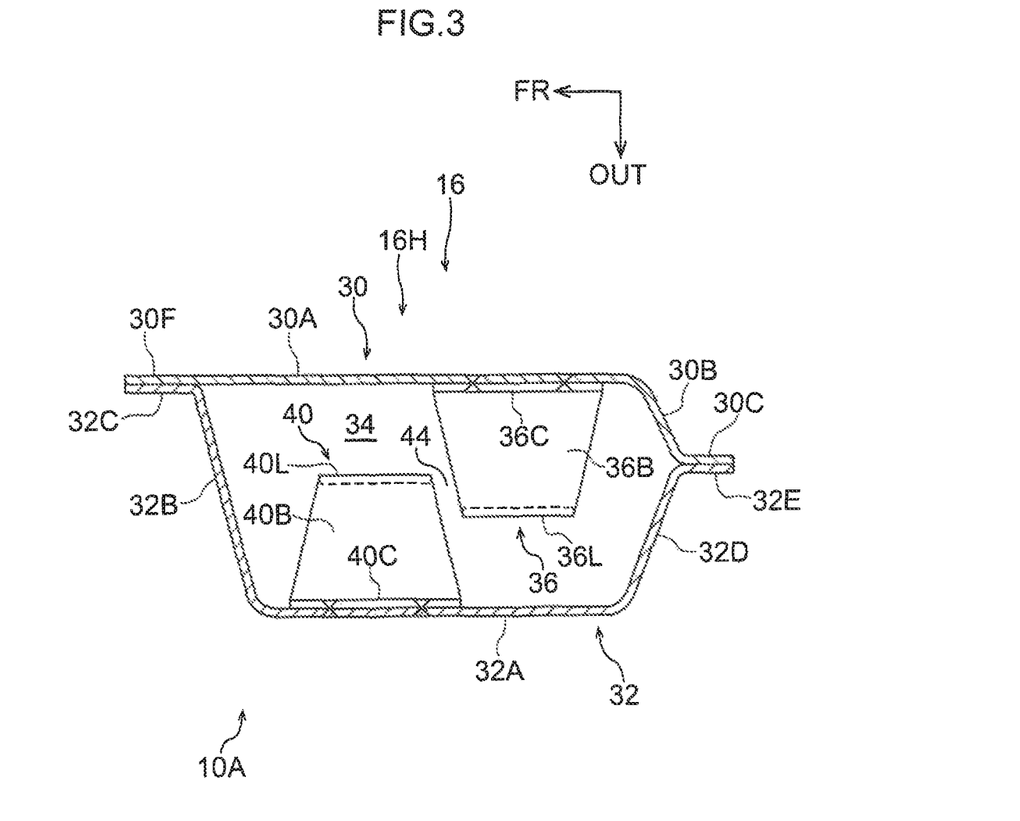
FIG. 3 is a plan sectional view showing an example of a state in which the front pillar is cut at a cutting position that corresponds to line 3-3 of FIG. 2.
Figure 4:
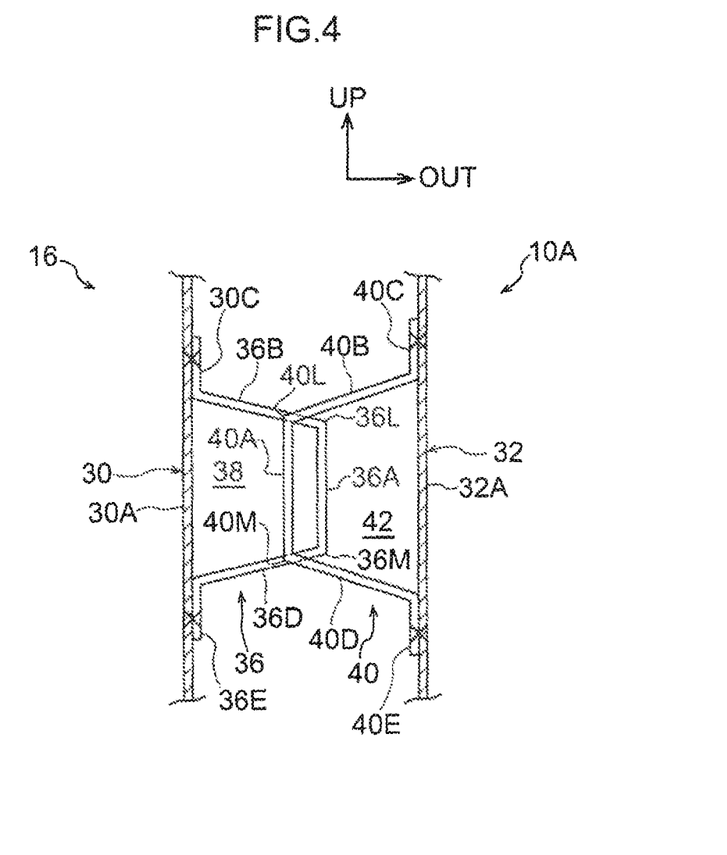
FIG. 4 is a vertical sectional view showing an example of a state in which the front pillar is cut at a cutting position that corresponds to line 4-4 of FIG. 2.

An example of a portion of the front pillar 16, to which the vehicle pillar structure shown in FIG. 1 is applied, is shown in a perspective view in FIG. 2. Note that, in FIG. 2, a pillar outer panel 32 that is described later is seen-through, and the outer shape thereof is illustrated by the two-dot chain lines. Further, FIG. 3 is a plan sectional view of a state in which the front pillar 16 is cut at a cutting position corresponding to line 3-3 of FIG. 2, and FIG. 4 is a vertical sectional view of a state in which the front pillar 16 is cut at a cutting position corresponding to line 4-4 of FIG. 2.

As shown in FIG. 2 as an example, the front pillar 16 has a pillar main body portion 16H that is structured by a pillar inner panel 30 and the pillar outer panel 32. The pillar main body portion 16H is formed in the shape of a hollow pillar, and extends along the vehicle vertical direction.

The pillar inner panel 30 structures the region at the vehicle transverse direction inner side of the pillar main body portion 16H. The pillar inner panel 30 has an inner wall portion 30A that structures the vertical wall at the vehicle transverse direction inner side of the front pillar 16. This inner wall portion 30A extends along the vehicle vertical direction with the vehicle transverse direction being the plate thickness direction thereof. An end portion of an unillustrated instrument panel reinforcement is mounted via an unillustrated mounting bracket to the rear portion of the inner wall portion 30A. Note that this instrument panel reinforcement is a pipe-shaped member that spans in the vehicle vertical direction between the pillar inner panels 30 of the pair of left and right front pillars 16. Further, the rear portion of the pillar inner panel 30 has a rear side vertical wall portion 30B that is bent and extends toward the vehicle transverse direction outer side from the rear end portion of the inner wall portion 30A, and has a rear side flange portion 30C that is bent and extends toward the vehicle rear side from the end portion at the vehicle transverse direction outer side of the rear side vertical wall portion 30B.

The pillar outer panel 32 is disposed at the vehicle transverse direction outer side of the pillar inner panel 30 at the front pillar 16, so as to face the pillar inner panel 30. The pillar outer panel 32 structures the region at the vehicle transverse direction outer side of the pillar main body portion 16H. As an example, as shown in FIG. 3, the pillar outer panel 32 is formed in a substantial hat-shape whose opening portion faces toward the vehicle transverse direction inner side as seen in a plan sectional view.

The pillar outer panel 32 has an outer wall portion 32A that structures the vertical wall at the vehicle transverse direction outer side of the front pillar 16. This outer wall portion 32A extends along the vehicle vertical direction with the vehicle transverse direction being the plate thickness direction thereof. The front portion of the pillar outer panel 32 has a front side vertical wall portion 32B that is bent and extends toward the vehicle transverse direction inner side from the front end portion of the outer wall portion 32A, and has a front side flange portion 32C that is bent and extends toward the vehicle front side from the end portion at the vehicle transverse direction inner side of the front side vertical wall portion 32B. Further, the rear portion of the pillar outer panel 32 has a rear side vertical wall portion 32D that is bent and extends toward the vehicle transverse direction inner side from the rear end portion of the outer wall portion 32A, and has a rear side flange portion 32E that is bent and extends toward the vehicle rear side from the end portion at the vehicle transverse direction inner side of the rear side vertical wall portion 32D.

The front side flange portion 32C of the pillar outer panel 32 and a front end portion 30F of the inner wall portion 30A of the pillar inner panel 30 are joined together. The rear side flange portion 32E of the pillar outer panel 32 and the rear side flange portion 30C of the pillar inner panel 30 are joined together. Namely, by the pillar outer panel 32 and the pillar inner panel 30, the pillar main body portion 16H forms a first closed cross-section portion 34 that extends along the vehicle vertical direction.

A portion of an unillustrated side outer panel is disposed further toward the vehicle transverse direction outer side than the pillar outer panel 32, and is joined to the front side flange portion 32C and the rear side flange portion 32E of the pillar outer panel 32. Note that this side outer panel structures a portion of the outer plate portion of the automobile.

An inner side reinforcing member 36 is disposed at the rear portion side of the interior of the pillar main body portion 16H (i.e., within the first closed cross-section portion 34). The inner side reinforcing member 36 is formed of steel as an example. As shown in FIG. 4, as an example, the inner side reinforcing member 36 is formed in the shape of a hat in cross-section that opens toward the vehicle transverse direction inner side as seen in a vehicle front view (is formed in an open cross-sectional shape in the broad sense), and projects out toward the pillar outer panel 32 side.

The vehicle transverse direction outer side region of the inner side reinforcing member 36 is structured by a vertical wall portion 36A. The vertical wall portion 36A extends along the vehicle vertical direction with the vehicle transverse direction being the plate thickness direction thereof. The upper portion of the inner side reinforcing member 36 has an upper wall portion 36B that is bent and extends toward the vehicle transverse direction inner side from the upper end portion of the vertical wall portion 36A, and has an upper side flange portion 36C that is bent and extends toward the vehicle upper side from the end portion at the vehicle transverse direction inner side of the upper wall portion 36B. Further, the lower portion of the inner side reinforcing member 36 has a lower wall portion 36D that is bent and extends toward the vehicle transverse direction inner side from the lower end portion of the vertical wall portion 36A, and has a lower side flange portion 36E that is bent and extends toward the vehicle lower side from the end portion at the vehicle transverse direction inner side of the lower wall portion 36D.

The upper side flange portion 36C and the lower side flange portion 36E of the inner side reinforcing member 36 are joined by spot welding to the inner wall portion 30A of the pillar inner panel 30. The inner side reinforcing member 36, together with the pillar inner panel 30, forms a second closed cross-section portion 38. Note that, in FIG. 2 and the like, the points that are spot-welded are shown by the "X" mark.

As an example, as shown in FIG. 3, the upper wall portion 36B of the inner side reinforcing member 36 is formed in a trapezoidal shape that has front-rear symmetry in the vehicle longitudinal direction as seen in a vehicle plan view. The length in the vehicle longitudinal direction of the vehicle transverse direction inner side portion of the upper wall portion 36B is set to be longer than the length in the vehicle longitudinal direction of the vehicle transverse direction outer side end portion thereof. The lower wall portion 36D (see FIG. 2) of the inner side reinforcing member 36 is formed in a similar shape as the upper wall portion 36B of the inner side reinforcing member 36 as seen in a vehicle plan view. Namely, the front end of the inner side reinforcing member 36 is inclined to the vehicle front side toward the vehicle transverse direction inner side, and the rear end of the inner side reinforcing member 36 is inclined to the vehicle rear side toward the vehicle transverse direction inner side.

As an example, as shown in FIG. 2, ridgeline portions 36L, 36M that extend in the vehicle longitudinal direction are formed at the inner side reinforcing member 36 at the upper and lower end edge sides of the vertical wall portion 36A. The ridgeline portion 36L, which is at the vehicle transverse direction outer side and the upper side of the inner side reinforcing member 36, is the boundary portion between the vehicle transverse direction outer side surface of the vertical wall portion 36A and the top surface of the upper wall portion 36B. Further, the ridgeline portion 36M, which is at the vehicle transverse direction outer side and the lower side of the inner side reinforcing member 36, is the boundary portion between the vehicle transverse direction outer side surface of the vertical wall portion 36A and the bottom surface of the lower wall portion 36D.

Further, an outer side reinforcing member 40 is disposed at the front portion side of the interior of the pillar main body portion 16H (i.e., within the first closed cross-section portion 34). The outer side reinforcing member 40 is formed of steel as an example. As shown in FIG. 4, as an example, the outer side reinforcing member 40 is formed in the shape of a hat in cross-section that opens toward the vehicle transverse direction outer side as seen in a vehicle front view (is formed in an open cross-sectional shape in the broad sense), and projects out toward the pillar inner panel 30 side.

The vehicle transverse direction inner side region of the outer side reinforcing member 40 is structured by a vertical wall portion 40A. The vertical wall portion 40A extends along the vehicle vertical direction with the vehicle transverse direction being the plate thickness direction thereof. The upper portion of the outer side reinforcing member 40 has an upper wall portion 40B that is bent and extends toward the vehicle transverse direction outer side from the upper end portion of the vertical wall portion 40A, and has an upper side flange portion 40C that is bent and extends toward the vehicle upper side from the end portion at the vehicle transverse direction outer side of the upper wall portion 40B. Further, the lower portion of the outer side reinforcing member 40 has a lower wall portion 40D that is bent and extends toward the vehicle transverse direction outer side from the lower end portion of the vertical wall portion 40A, and has a lower side flange portion 40E that is bent and extends toward the vehicle lower side from the end portion at the vehicle transverse direction outer side of the lower wall portion 40D.

The upper side flange portion 40C and the lower side flange portion 40E of the outer side reinforcing member 40 are joined by spot welding to the outer wall portion 32A of the pillar outer panel 32. The outer side reinforcing member 40, together with the pillar outer panel 32, forms a third closed cross-section portion 42.

As an example, as shown in FIG. 3, the upper wall portion 40B of the outer side reinforcing member 40 is formed in a trapezoidal shape that has front-rear symmetry in the vehicle longitudinal direction as seen in a vehicle plan view. The length in the vehicle longitudinal direction of the vehicle transverse direction outer side portion of the upper wall portion 40B is set to be longer than the length in the vehicle longitudinal direction of the vehicle transverse direction inner side end portion thereof. The lower wall portion 40D (see FIG. 2) of the outer side reinforcing member 40 is formed in a similar shape as the upper wall portion 40B of the outer side reinforcing member 40 as seen in a vehicle plan view. Namely, the front end of the outer side reinforcing member 40 is inclined to the vehicle front side toward the vehicle transverse direction outer side, and the rear end of the outer side reinforcing member 40 is inclined to the vehicle rear side toward the vehicle transverse direction outer side.

As an example, as shown in FIG. 2, ridgeline portions 40L, 40M that extend in the vehicle longitudinal direction are formed at the outer side reinforcing member 40 at the upper and lower end edge sides of the vertical wall portion 40A. The ridgeline portion 40L, which is at the vehicle transverse direction inner side and the upper side of the outer side reinforcing member 40, is the boundary portion between the vehicle transverse direction inner side surface of the vertical wall portion 40A and the top surface of the upper wall portion 40B. Further, the ridgeline portion 40M, which is at the vehicle transverse direction inner side and the lower side of the outer side reinforcing member 40, is the boundary portion between the vehicle transverse direction inner side surface of the vertical wall portion 40A and the bottom surface of the lower wall portion 40D.

The outer side reinforcing member 40 is provided adjacent to the vehicle front side of the inner side reinforcing member 36. As an example, as shown in FIG. 3, a gap 44 is formed between the outer side reinforcing member 40 and the inner side reinforcing member 36. Note that the gap 44 is set from the standpoints of assemblability and the prevention of noise generation at the time of usual travelling. Further, as shown in FIG. 4 as an example, the outer side reinforcing member 40 is set at a position that overlaps with a portion of the inner side reinforcing member 36 as seen in a vehicle front view. Moreover, the ridgeline portions 40L, 40M of the outer side reinforcing member 40 are set at positions that overlap portions of the inner side reinforcing member 36 as seen in a vehicle front view.

Further, as shown in FIG. 1 as an example, the inner side reinforcing member 36 and the outer side reinforcing member 40 are disposed, as an example, at the vehicle rear side of the apron upper member 28 and the vehicle front side of the belt line reinforcement 26. Further, as an example, the inner side reinforcing member 36 and the outer side reinforcing member 40 are set at positions that overlap the rear end portion 28A of the apron upper member 28 and a front end portion 26A of the belt line reinforcement as seen in a vehicle front view.

(Method of Manufacturing Front Pillar)

The above-described front pillar 16 is manufactured by the following steps.

Figure 6A:
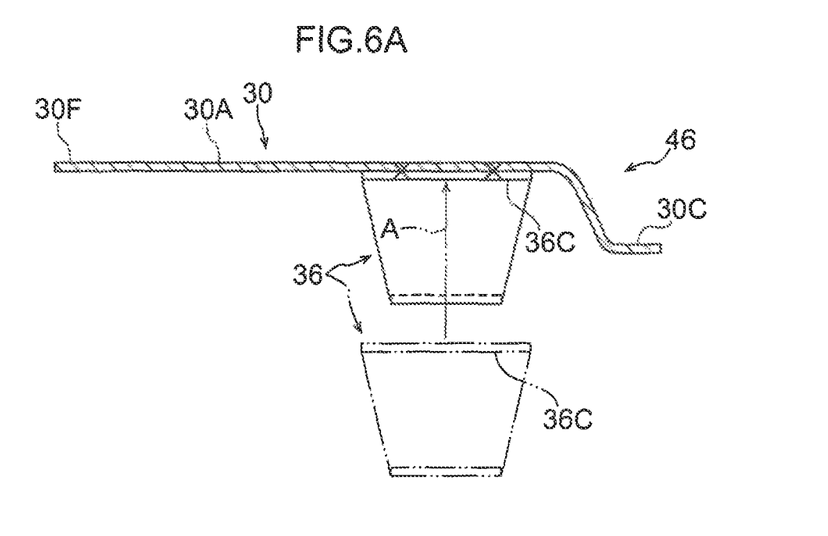
FIG. 6A is a process drawing showing, in a plan sectional view, an example of a method of manufacturing the front pillar of FIG. 1, and shows an example of a step of manufacturing an inner sub assembly.

First, in a first step that is shown in FIG. 6A as an example, the inner side reinforcing member 36 is moved with respect to the pillar inner panel 30 from the position shown by the two-dot chain lines to the position shown by the solid lines (refer to arrow A), and the upper side flange portion 36C and the lower side flange portion 36E (see FIG. 2) of the inner side reinforcing member 36 are superposed on the inner wall portion 30A of the pillar inner panel 30. Next, the superposed regions are joined by spot welding, and an inner sub-assembly 46 is manufactured.

Figure 6B:
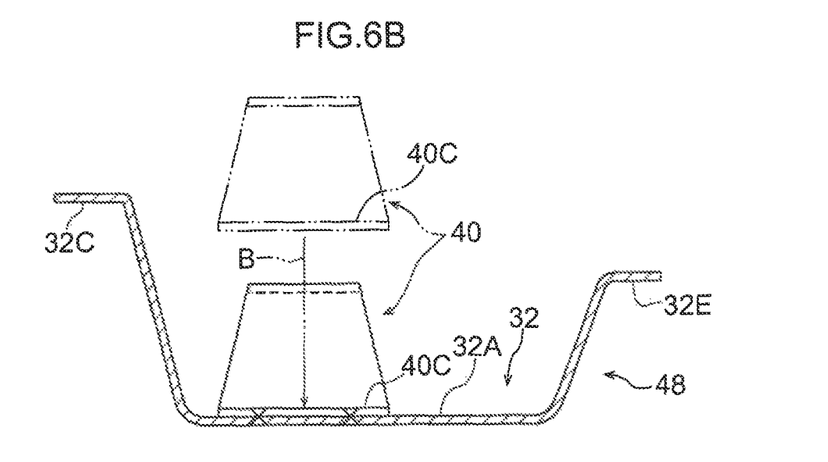
FIG. 6B is a process drawing showing, in a plan sectional view, the example of a method of manufacturing the front pillar of FIG. 1, and shows an example of a step of manufacturing an outer sub assembly.

Further, in a second step that is shown in FIG. 6B as an example, the outer side reinforcing member 40 is moved with respect to the pillar outer panel 32 from the position shown by the two-dot chain lines to the position shown by the solid lines (refer to arrow B), and the upper side flange portion 40C and the lower side flange portion 40E (see FIG. 2) of the outer side reinforcing member 40 are superposed on the outer wall portion 32A of the pillar outer panel 32. Next, the superposed regions are joined by spot welding, and an outer-sub assembly 48 is manufactured. Note that either of the first step or the second step may be carried out first.

Figure 6C:
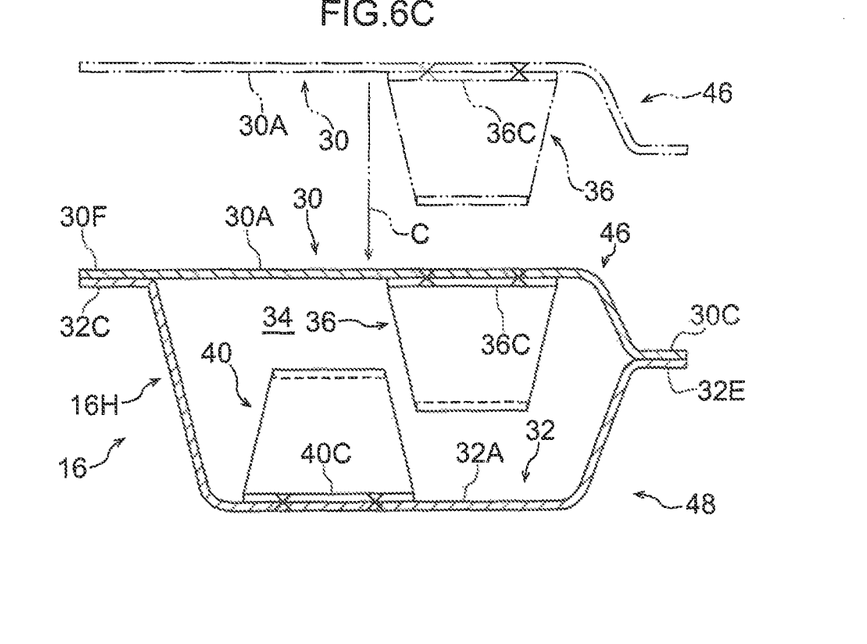
FIG. 6C is a process drawing showing, in a plan sectional view, the example of a method of manufacturing the front pillar of FIG. 1, and shows an example of a step of joining the inner sub assembly and the outer sub assembly.

Finally, in a third step that is shown in FIG. 6C as an example, the inner sub-assembly 46 is moved relative to the outer sub-assembly 48 from the position shown by the two-dot chain lines to the position shown by the solid lines (refer to arrow C), and the front and rear ends of the inner sub-assembly 46 and the outer sub-assembly 48 are superposed together. Next, the superposed regions are joined by spot welding. Due thereto, the front pillar 16 is manufactured.

In this way, before the first closed cross-section portion 34 is formed by the pillar inner panel 30 and the pillar outer panel 32, the inner side reinforcing member 36 is joined to the pillar inner panel 30 and the outer side reinforcing member 40 is joined to the pillar outer panel 32. Due thereto, the inner side reinforcing member 36 and the outer side reinforcing member 40 can be joined well to the inner side of the pillar main body portion 16H, even if a work hole is not provided in the pillar main body portion 16H.

Further, for example, in the case of a comparative example in which a bulkhead is welded so as to span between a pillar inner panel and a pillar outer panel, because high accuracy of the parts is required, the bulkhead is welded in a state in which the pillar inner panel and the pillar outer panel have been made to face one another, and the workability is poor. In contrast, in the present embodiment, because accuracy of parts to the extent of that of the above-described comparative example is not needed, there is no need to weld the inner side reinforcing member 36 and the outer side reinforcing member 40 in a state in which the pillar inner panel 30 and the pillar outer panel 32 have been made to face one another, and therefore, the workability is good and the front pillar 16 is manufactured easily.

(Operation/Effects)

Operation and effects of the above-described embodiment at the time of a collision are described next. Note that, hereinafter, description is given by using, as an example, a case in which a collision body (a barrier) front-collides with a vehicle transverse direction one side of the vehicle 10 shown in FIG. 1. A small overlap collision and an offset collision can be given as examples of such a front collision. A small overlap collision is a form of a collision in which a portion, which is further toward the vehicle transverse direction outer side than the front side member (not shown), of the vehicle 10 collides with a collision body.

When the vehicle 10 is involved in a front collision such as a small overlap collision or the like, collision load F at that time is input from the apron upper member 28 or the collision body to the front pillar 16. Therefore, the front pillar 16 is pushed toward the vehicle rear side.

Here, the inner side reinforcing member 36 that is shown in FIG. 4 as an example projects out toward the pillar outer panel 32 side, and, together with the pillar inner panel 30, forms the second closed cross-section portion 38. In contrast, the outer side reinforcing member 40 projects out toward the pillar inner panel 30 side, and, together with the pillar outer panel 32, forms the third cross-section portion 42. The outer side reinforcing member 40 is provided at the vehicle front side of the inner side reinforcing member 36, and overlaps a portion of the inner side reinforcing member 36 as seen in a vehicle front view. Further, in a case in which the collision load F, which runs along the vehicle longitudinal direction and is shown in FIG. 2 as an example, is input to the pillar main body portion 16H, the collision load F is transmitted from the front side of the pillar main body portion 16H via the outer side reinforcing member 40 to the inner side reinforcing member 36, and further, is transmitted from the inner side reinforcing member 36 toward the rear end portion side of the pillar main body portion 16H. Therefore, cross-sectional deformation of the front pillar 16 is suppressed (see FIG. 5).

Further, in the present embodiment, the inner side reinforcing member 36 is formed in an open cross-sectional shape that opens toward the vehicle transverse direction inner side as seen in a vehicle front view (more concretely, a hat shape in cross-section). Therefore, the second closed cross-section portion 38, which is formed by the inner side reinforcing member 36 and the pillar inner panel 30, extends in the vehicle longitudinal direction. Further, the outer side reinforcing member 40 is formed in an open cross-sectional shape that opens toward the vehicle transverse direction outer side as seen in a vehicle front view (more concretely, a hat shape in cross-section). Therefore, the third closed cross-section portion 42, which is formed by the outer side reinforcing member 40 and the pillar outer panel 32, extends in the vehicle longitudinal direction. Thus, in a case in which the collision load F that runs along the vehicle longitudinal direction is input to the pillar main body portion 16H, the collision load F is transmitted along the extending direction of the third closed cross-section portion 42 and the second closed cross-section portion 38, and therefore, cross-sectional deformation of the front pillar 16 is suppressed effectively.

Figure 5:
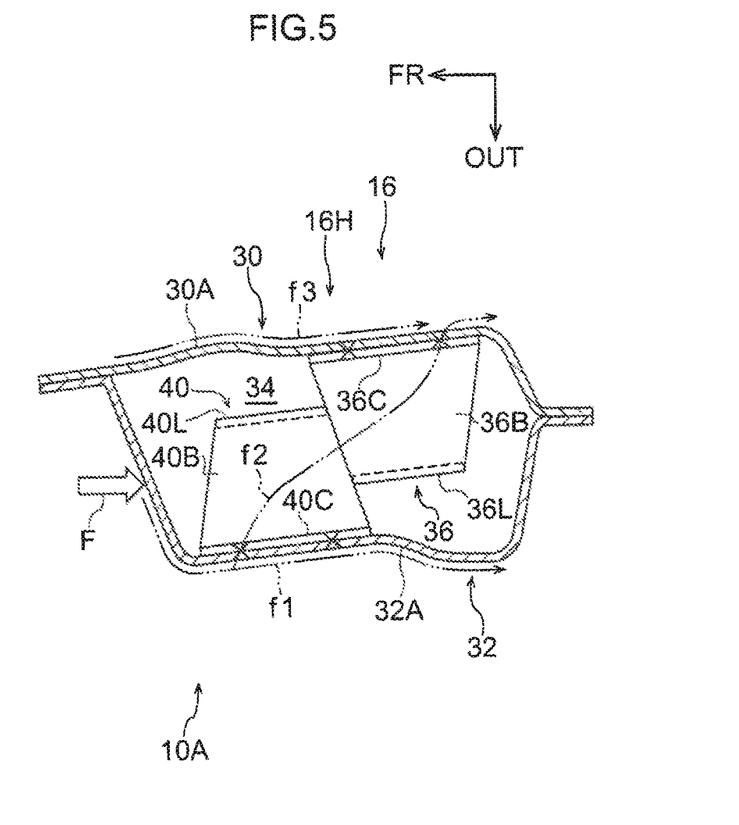
FIG. 5 is a plan sectional view showing a state at the time of a front collision, in the same cut section as in FIG. 3.

Further, as shown in FIG. 3 as an example, the front end of the inner side reinforcing member 36 is inclined to the vehicle front side toward the vehicle transverse direction inner side, and the rear end is inclined to the vehicle rear side toward the vehicle transverse direction inner side. Therefore, the length in the vehicle longitudinal direction of the region, which is at the side that is joined to the pillar inner panel 30, of the inner side reinforcing member 36 can be made to be long. Thus, the pillar inner panel 30 and the inner side reinforcing member 36 can be joined more securely. Further, the front end of the outer side reinforcing member 40 is inclined to the vehicle front side toward the vehicle transverse direction outer side, and the rear end is inclined to the vehicle rear side toward the vehicle transverse direction outer side. Therefore, the length in the vehicle longitudinal direction of the region, which is at the side that is joined to the pillar outer panel 32, of the outer side reinforcing member 40 can be made to be long. Thus, the pillar outer panel 32 and the outer side reinforcing member 40 can be joined more securely. Due to the above, as shown in FIG. 5 as an example, in a case in which the collision load F that runs along the vehicle longitudinal direction is input to the pillar main body portion 16H, deformation of the joined portion side of the pillar inner panel 30 and the inner side reinforcing member 36 can be suppressed more, and deformation of the joined portion side of the pillar outer panel 32 and the outer side reinforcing member 40 can be suppressed more. Note that, in FIG. 5, the approximate directions of transmission of the collision load F are shown by arrows f1, f2, f3.

Further, as shown in FIG. 2 as an example, the ridgeline portions 36L, 36M that extend in the vehicle longitudinal direction are formed at the inner side reinforcing member 36, and the ridgeline portions 40L, 40M that extend in the vehicle longitudinal direction are formed at the outer side reinforcing member 40. Therefore, when the collision load F that runs along the vehicle longitudinal direction is input to the outer side reinforcing member 40, the collision load F is mainly transmitted along the ridgeline portions 40L, 40M, and when a part of the collision load F is transmitted from the outer side reinforcing member 40 to the inner side reinforcing member 36, that part of the collision load F is mainly transmitted toward the vehicle rear side along the ridgeline portions 36L, 36M.

Here, as shown as an example in FIG. 4, the ridgeline portions 40L, 40M of the outer side reinforcing member 40 are set at positions that overlap portions of the inner side reinforcing member 36 as seen in a vehicle front view. Therefore, in a case in which the collision load F, which is shown as an example in FIG. 2 and runs along the vehicle longitudinal direction, is input to the outer side reinforcing member 40, load is transmitted well between the ridgeline portions 40L, 40M of the outer side reinforcing member 40 and portions of the inner side reinforcing member 36.

As described above, in accordance with the vehicle pillar structure of the present embodiment, even if a work hole is not provided in the pillar main body portion 16H of the front pillar 16, the inner side reinforcing member 36 and the outer side reinforcing member 40 can be joined well to the pillar main body portion 16H, and cross-sectional deformation of the front pillar 16 with respect to load input in the vehicle longitudinal direction can be suppressed.

Modified Examples of First Embodiment

Figure 7A:
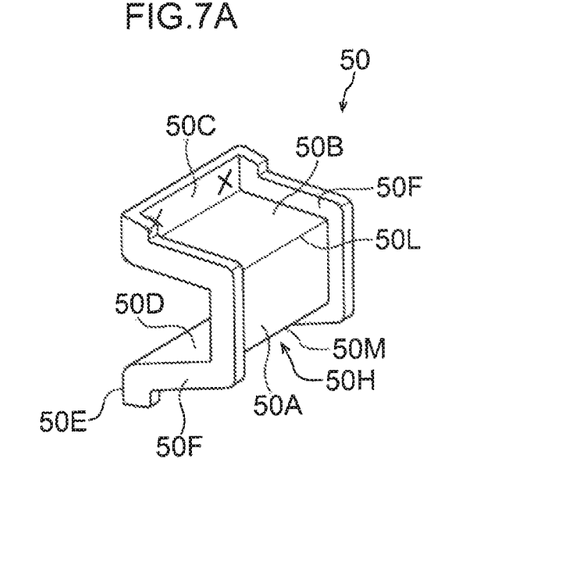
FIG. 7A is a perspective view showing an example of a reinforcing member relating to a modified example, and shows an example of a reinforcing member that is applied to a first modified example.
Figure 7B:
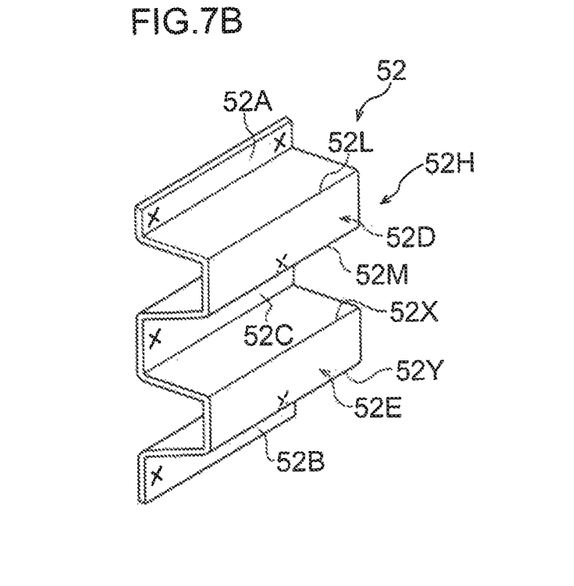
FIG. 7B is a perspective view showing an example of a reinforcing member relating to a modified example, and shows an example of a reinforcing member that is applied to a second modified example.

Modified examples of the first embodiment are described next. FIG. 7A and FIG. 7B show, in perspective views, examples of reinforcing members 50, 52 that can be provided instead of the outer side reinforcing member 40 and the inner side reinforcing member 36 (refer to FIG. 2 and the like for the both) of the vehicle pillar structure of the first embodiment. Note that, in a case in which the reinforcing member 50, 52 is provided instead of the outer side reinforcing member 40 of the first embodiment (refer to FIG. 2 and the like), that reinforcing member 50, 52 is the outer side reinforcing member. Further, in a case in which the reinforcing member 50, 52 is provided instead of the inner side reinforcing member 36 of the first embodiment (refer to FIG. 2 and the like), that reinforcing member 50, 52 is the inner side reinforcing member.

An example of the reinforcing member 50 that is applied to a first modified example is shown in FIG. 7A. The reinforcing member 50 has a main body portion 50H that is hat-shaped in cross-section. The main body portion 50H is structured substantially similarly to the outer side reinforcing member 40 and the inner side reinforcing member 36 of the first embodiment (refer to FIG. 2 and the like for the both), and has a vertical wall portion 50A, an upper wall portion 50B, an upper side flange portion 50C, a lower wall portion 50D and a lower side flange portion 50E. Further, in the same way as the outer side reinforcing member 40 and the inner side reinforcing member 36 of the first embodiment (refer to FIG. 2 and the like for the both), the reinforcing member 50 has ridgeline portions 50L, 50M that are disposed along the vehicle longitudinal direction. Flange portions 50F, which project out toward the outer side of the open cross-section of the reinforcing member 50, are formed at the reinforcing member 50 at the both end portion sides in the direction parallel to the extending direction of the ridgeline portions SQL, 50M.

In a case in which the reinforcing member 50 is provided instead of the outer side reinforcing member 40 of the first embodiment (refer to FIG. 2 and the like), the reinforcing member 50 is disposed so as to become an open cross-sectional shape that opens toward the vehicle transverse direction outer side as seen in a vehicle front view, and the upper side flange portion 50C and the lower side flange portion 50E are joined by spot welding to the pillar outer panel 32 (refer to FIG. 2 and the like). Further, in a case in which the reinforcing member 50 is provided instead of the inner side reinforcing member 36 of the first embodiment (refer to FIG. 2 and the like), the reinforcing member 50 is disposed so as to become an open cross-sectional shape that opens toward the vehicle transverse direction inner side as seen in a vehicle front view, and the upper side flange portion 50C and the lower side flange portion 50E are joined by spot welding to the pillar inner panel 30 (refer to FIG. 2 and the like). Note that the "X" marks shown at the upper side flange portion 50C are the places that are spot-welded. Further, although not illustrated, as seen in a vehicle front view, the outer side reinforcing member to which the reinforcing member 50 is applied is disposed at a position of overlapping a portion of the inner side reinforcing member to which the reinforcing member 50 is applied, and the inner side reinforcing member to which the reinforcing member 50 is applied and the outer side reinforcing member to which the reinforcing member 50 is applied are structured such that the flange portions 50F are provided at the end portions at the sides at which the inner side reinforcing member and the outer side reinforcing member face one another. Moreover, there is a structure in which, at the outer side reinforcing member to which the reinforcing member 50 is applied and the inner side reinforcing member to which the reinforcing member 50 is applied, the flange portions 50F, which are provided at the end portions at the sides at which the inner side reinforcing member and the outer side reinforcing member face one another, have regions that overlap one another as seen in a vehicle front view.

In accordance with the above-described structure, in a case in which load in the vehicle longitudinal direction is input to the pillar main body portion 16H (refer to FIG. 2 and the like), and the load is transmitted from the outer side reinforcing member to which the reinforcing member 50 is applied to the inner side reinforcing member to which the reinforcing member 50 is applied, the load is transmitted from one of the flange portions 50F that face one another to the other flange portion 50F. Due thereto, the surface area of contact of the outer side reinforcing member and the inner side reinforcing member can be made to be large as compared with a structure that does not have the flange portions 50F, and therefore, the load transmitting efficiency can be improved. Further, in accordance with the above-described structure, the rigidity of the reinforcing member 50 itself with respect to load input in the vehicle longitudinal direction also can be improved, and the risk of breakage of the reinforcing member 50 at the time of a collision can be reduced.

An example of the reinforcing member 52 to which a second modified example is applied is shown in FIG. 7B. The reinforcing member 52 is formed in the form of a plate that is rectangular wave-shaped that is such that two hat shapes in cross-section are continuous with one another. Namely, the reinforcing member 52 has a main body portion 52H that has an upper side flange portion 52A and a lower side flange portion 52B and at which convex portions and concave portions are formed alternately and continuously between the upper side flange portion 52A and the lower side flange portion 52B.

The main body portion 52H of the reinforcing member 52H has an intermediate flange portion 52C at the intermediate portion thereof between the upper side flange portion 52A and the lower side flange portion 52B. The intermediate flange portion 52C is set directly beneath the upper side flange portion 52A and directly above the lower side flange portion 52B. The lower end of the upper side flange portion 52A and the upper end of the intermediate flange portion 52C are connected by an upper side protruding portion 52D. The upper side protruding portion 52D has ridgeline portions 52L, 52M that are disposed along the vehicle longitudinal direction. Further, the lower end of the intermediate flange portion 52C and the upper end of the lower side flange portion 52B are joined by a lower side protruding portion 52E. The lower side protruding portion 52E has ridgeline portions 52X, 52Y that are disposed along the vehicle longitudinal direction.

In a case in which the reinforcing member 52 is provided instead of the outer side reinforcing member 40 of the first embodiment (refer to FIG. 2 and the like), the reinforcing member 52 is disposed so as to become an open cross-sectional shape that opens toward the vehicle transverse direction outer side as seen in a vehicle front view, and the upper side flange portion 52A, the intermediate flange portion 52C and the lower side flange portion 52B are joined by spot welding to the pillar outer panel 32 (refer to FIG. 2 and the like). Further, in a case in which the reinforcing member 52 is provided instead of the inner side reinforcing member 36 of the first embodiment (refer to FIG. 2 and the like), the reinforcing member 52 is disposed so as to become an open cross-sectional shape that opens toward the vehicle transverse direction inner side as seen a vehicle front view, and the upper side flange portion 52A, the intermediate flange portion 52C and the lower side flange portion 52B are joined by spot welding to the pillar inner panel 30 (refer to FIG. 2 and the like). Note that the "X" marks in the drawing are the places that are spot-welded. Further, as seen in a vehicle front view, the outer side reinforcing member to which the reinforcing member 52 is applied is disposed at a position of overlapping a portion of the inner side reinforcing member to which the reinforcing member 52 is applied.

In accordance with the above-described structure as well, operation and effects that are similar to those of the above-described first embodiment are obtained. Note that a form in which the intermediate flange portion 52C is not joined to the pillar outer panel 32 or the pillar inner panel 30 (refer to FIG. 2 and the like for the both) can be employed as a further modified example of the above-described second modified example.

Second Embodiment

Figure 8A:
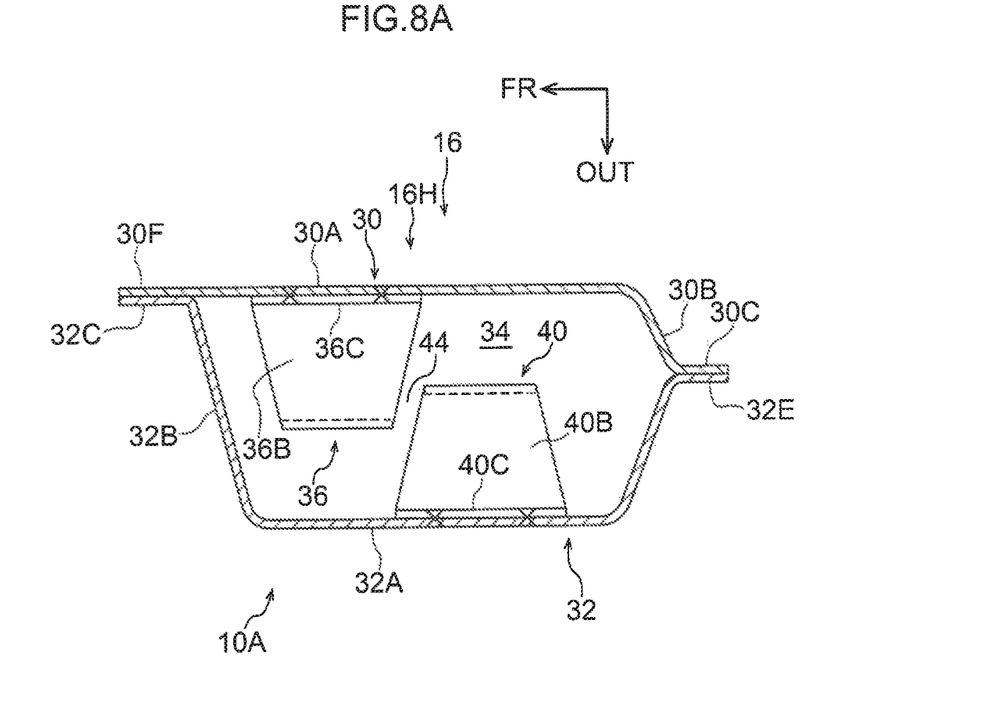
FIG. 8A is a plan sectional view showing an example of a vehicle pillar structure relating to a second embodiment of the technique of the present disclosure.

An example of a vehicle pillar structure relating to a second embodiment of the technique of the present disclosure is described next by using FIG. 8A. An example of the vehicle pillar structure relating to the present embodiment is shown in FIG. 8A in a plan sectional view (a cross-sectional view corresponding to FIG. 3 of the first embodiment). Note that structural portions that are substantially similar to those of the first embodiment are denoted by the same reference numerals, and description thereof is omitted.

As shown in FIG. 8A as an example, the present embodiment differs from the vehicle pillar structure relating to the first embodiment with regard to the point that the outer side reinforcing member 40 is provided at the vehicle rear side of the inner side reinforcing member 36. The other structures are structured similarly to the first embodiment, and the outer side reinforcing member 40 overlaps a portion of the inner side reinforcing member 36 as seen in a vehicle front view. Note that, for convenience of explanation, the inner side reinforcing member 36 and the outer side reinforcing member 40 are denoted by the same reference numerals as in the first embodiment.

In accordance with the structure of the present embodiment as well, operation and effects that are basically similar to those of the above-described first embodiment are obtained.

Third Embodiment

Figure 8B:
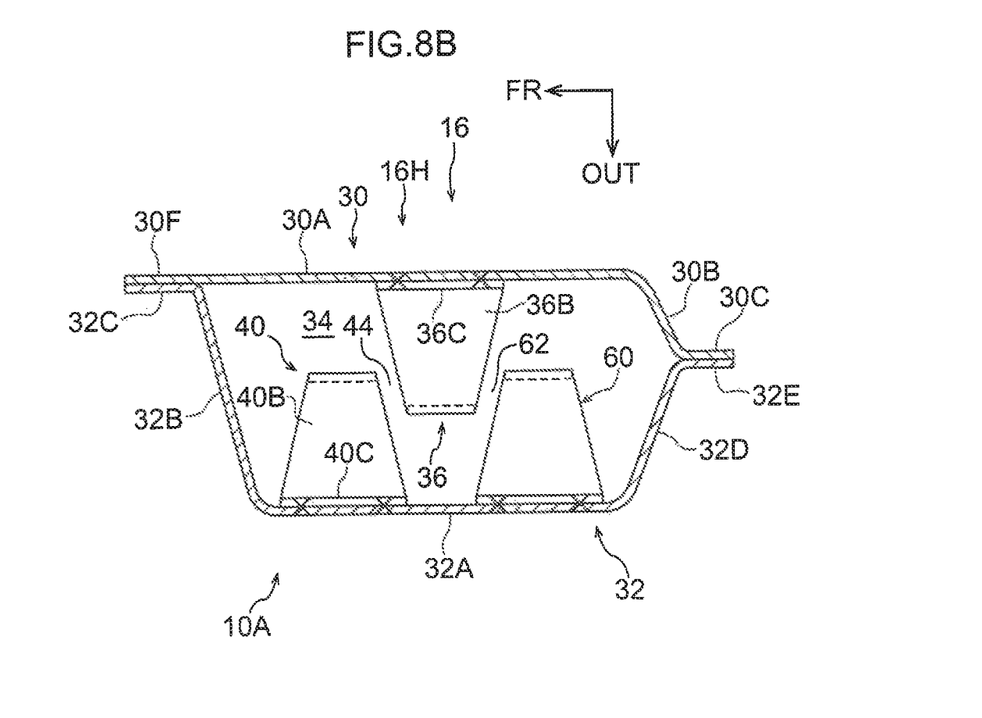
FIG. 8B is a plan sectional view showing an example of a vehicle pillar structure relating to a third embodiment of the technique of the present disclosure.

An example of a vehicle pillar structure relating to a third embodiment of the technique of the present disclosure is described next by using FIG. 8B. An example of the vehicle pillar structure relating to the present embodiment is shown in FIG. 8B in a plan sectional view (a cross-sectional view corresponding to FIG. 3 of the first embodiment). Note that structural portions that are substantially similar to those of the first embodiment are denoted by the same reference numerals, and description thereof is omitted.

As shown as an example in FIG. 8B, the present embodiment differs from the vehicle pillar structure relating to the first embodiment with regard to the point that, in addition to the outer side reinforcing member 40 that is disposed at the vehicle front side of the inner side reinforcing member 36, an outer side reinforcing member 60 that serves as an outer side reinforcing member is provided at the vehicle rear side of the inner side reinforcing member 36. The other structures are structures that are similar to those of the first embodiment, and the outer side reinforcing member 60 overlaps a portion of the inner side reinforcing member 36 as seen in a vehicle front view. The outer side reinforcing member 60 is structured substantially similarly to the outer side reinforcing member 40, except for the position of placement thereof in the vehicle longitudinal direction. A gap 62 is formed between the outer side reinforcing member 60 and the inner side reinforcing member 36.

In accordance with the structure of the present embodiment as well, operation and effects that are basically similar to those of the above-described first embodiment are obtained.

Supplementary Description of Embodiments

Note that, in the above-described embodiments, the outer side reinforcing member 40, 60 overlaps a portion of the inner side reinforcing member 36 as seen in a vehicle front view. However, as a modified example of the above-described embodiments, the outer side reinforcing member may overlap the entire inner side reinforcing member as seen in a vehicle front view.

Further, as a modified example of the above-described embodiments, the inner side reinforcing member may be formed in the shape of an open cross-section that opens toward the vehicle transverse direction inner side as seen in a vehicle front view, without being provided with ridgeline portions that extend in the vehicle longitudinal direction (e.g., may be formed in a shape in which the lower end of the upper side flange portion and the upper end of the lower side flange portion are connected by an arc-shaped portion). Similarly, the outer side reinforcing member may be formed in the shape of an open cross-section that opens toward the vehicle transverse direction outer side as seen in a vehicle front view, without being provided with ridgeline portions that extend in the vehicle longitudinal direction (e.g., may be formed in a shape in which the lower end of the upper side flange portion and the upper end of the lower side flange portion are connected by an arc-shaped portion).

Further, as a modified example of the above-described embodiments, the inner side reinforcing member may be formed in the shape of an open cross-section that opens toward the vehicle transverse direction inner side as seen in a vehicle plan view (e.g., in the shape of a hat in cross-section), and, in this case, may be provided with ridgelines that extend in the vehicle vertical direction. Similarly, the outer side reinforcing member may be formed in the shape of an open cross-section that opens toward the vehicle transverse direction outer side as seen in a vehicle plan view (e.g., in the shape of a hat in cross-section), and, in this case, may be provided with ridgelines that extend in the vehicle vertical direction.

Further, in the above-described embodiments, as shown as an example in FIG. 3, the front end of the inner side reinforcing member 36 is inclined to the vehicle front side toward the vehicle transverse direction inner side, and the rear end thereof is inclined to the vehicle rear side toward the vehicle transverse direction inner side, and such a structure is preferable. However, the inner side reinforcing member may be structured such that, for example, the front and rear ends thereof extend along the vehicle transverse direction. Further, similarly, the front end of the outer side reinforcing member 40 is inclined to the vehicle front side toward the vehicle transverse direction outer side, and the rear end thereof is inclined to the vehicle rear side toward the vehicle transverse direction outer side, and such a structure is preferable. However, the outer side reinforcing member may be structured such that, for example, the front and rear ends thereof extend along the vehicle transverse direction.

Further, in the above-described embodiments, as shown in FIG. 4 as an example, the ridgeline portions 40L, 40M of the outer side reinforcing member 40 are set at positions that overlap portions of the inner side reinforcing member 36 as seen in a vehicle front view. However, as a modified example of the above-described embodiments, the ridgeline portions (36L, 36M) of the inner side reinforcing member (36) may be set at positions that overlap portions of the outer side reinforcing member (40) as seen in a vehicle front view.

As a modified example of the above-described embodiments, one of the ridgeline portions of the inner side reinforcing member or the outer side reinforcing member does not have to be set at a position that overlaps with a portion of the other of the inner side reinforcing member or the outer side reinforcing member as seen in a vehicle front view.

Further, a structure in which a gap is not formed between the inner side reinforcing member and the outer side reinforcing member can be employed as a modified example of the above-described embodiments. Further, a synthetic resin material for filling the gap between the inner side reinforcing member and the outer side reinforcing member may be fixed to one of or both of the portions that face one another of the inner side reinforcing member and the outer side reinforcing member. This synthetic resin material may be a foamed body, or may structure an adhesion portion that adheres the inner side reinforcing member and the outer side reinforcing member to one another. To briefly describe a method of manufacturing a pillar in a case in which a synthetic resin material structures an adhesion portion that adheres the inner side reinforcing member and the outer side reinforcing member to one another, as an example, a thermosetting adhesive can be applied to one of or both of the portions that face one another of the inner side reinforcing member and the outer side reinforcing member before the third step that is shown in FIG. 6C as an example, and, after the third step, the adhesive can be hardened by placing the pillar in a high-temperature environment, and the portions that face one another of the inner side reinforcing member and the outer side reinforcing member can be adhered together by this adhesive.

Further, in the above-described embodiments, as shown as an example in FIG. 1, the outer side reinforcing member 40 and the inner side reinforcing member 36 are disposed at the vehicle rear side of the apron upper member 28. However, the inner side reinforcing member and the outer side reinforcing member may be disposed at another region such as, for example, at the interior of the pillar main body portion of the front pillar at the vehicle rear side of the front wheel (not illustrated), or the like.

Further, the vehicle pillar structure of the technique of the present disclosure is applied to the front pillar 16 in the above-described embodiments. However, the vehicle pillar structure of the technique of the present disclosure may be applied to the center pillar 18, or to a quarter pillar at the vehicle rear portion side, or the like.

The above-described embodiments and plural modified examples can be implemented by being combined together appropriately.

Although examples of the technique of the present disclosure have been described above, the technique of the present disclosure is not limited to the above, and, other than the above, can of course be implemented by being modified in various ways within a scope that does not depart from the gist thereof.

All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A vehicle pillar structure, comprising:
    a pillar inner panel that structures a region at a vehicle transverse direction inner side of a pillar main body portion, the pillar main body portion being disposed at a vehicle side portion and extending along a vehicle vertical direction;
    a pillar outer panel that structures a region at a vehicle transverse direction outer side of the pillar main body portion, and that forms a first closed cross-section portion together with the pillar inner panel;
    an inner side reinforcing member that is disposed at an interior of the pillar main body portion, that is joined to the pillar inner panel, that projects out toward the pillar outer panel side, and that forms a second closed cross-section portion together with the pillar inner panel; and
    an outer side reinforcing member that is disposed at the interior of the pillar main body portion, that is joined to the pillar outer panel, that projects out toward the pillar inner panel side, that forms a third closed cross-section portion together with the pillar outer panel, that is provided at a vehicle front side or a vehicle rear side of the inner side reinforcing member, and that overlaps with at least a portion of the inner side reinforcing member as seen in a vehicle front view.

2. The vehicle pillar structure of claim 1, wherein the inner side reinforcing member is formed in an open cross-sectional shape that opens toward a vehicle transverse direction inner side as seen in a vehicle front view, and the outer side reinforcing member is formed in an open cross-sectional shape that opens toward a vehicle transverse direction outer side as seen in a vehicle front view.

3. The vehicle pillar structure of claim 2, wherein flange portions, which jut out toward outer sides of open cross-sections of the inner side reinforcing member and the outer side reinforcing member and have regions that overlap with one another as seen in a vehicle front view, are formed at end portions of the inner side reinforcing member and the outer side reinforcing member, the end portions being at sides at which the inner side reinforcing member and the outer side reinforcing member face one another.

4. The vehicle pillar structure of claim 2, wherein
    a front end of the inner side reinforcing member is inclined to a vehicle front side toward a vehicle transverse direction inner side, and a rear end of the inner side reinforcing member is inclined to a vehicle rear side toward a vehicle transverse direction inner side, and
    a front end of the outer side reinforcing member is inclined to a vehicle front side toward a vehicle transverse direction outer side, and a rear end of the outer side reinforcing member is inclined to a vehicle rear side toward a vehicle transverse direction outer side.

5. The vehicle pillar structure of claim 2, wherein
    a ridgeline portion that extends in a vehicle longitudinal direction is formed at the inner side reinforcing member and at the outer side reinforcing member, respectively, and
    the ridgeline portion at one of the inner side reinforcing member or the outer side reinforcing member is set at a position that overlaps with a portion of another of the inner side reinforcing member or the outer side reinforcing member as seen in a vehicle front view.

6. The vehicle pillar structure of claim 1, wherein the inner side reinforcing member and the outer side reinforcing member are disposed at a vehicle front side of a beltline reinforcement at a front pillar.

7. The vehicle pillar structure of claim 6, wherein the inner side reinforcing member and the outer side reinforcing member are disposed at positions that overlap with a rear end portion of an apron upper member and with a front end portion of the beltline reinforcement as seen in a vehicle front view.

* * * * *